United States Patent [19]

Ise

[11] Patent Number: 5,238,309

[45] Date of Patent: Aug. 24, 1993

[54] GUIDE FOR THE UNIFORM BEARING OF A LOAD IN FOUR DIRECTIONS AND A RECIPROCATING TABLE INCLUDING THE SAME

[75] Inventor: Genjiro Ise, Yamaguchi, Japan

[73] Assignee: THK Co., Ltd., Tokyo, Japan

[21] Appl. No.: 878,385

[22] Filed: May 5, 1992

[30] Foreign Application Priority Data

May 13, 1991 [JP]  Japan .................................. 3-135345

[51] Int. Cl.⁵ .......................................... F16C 29/06
[52] U.S. Cl. .................................................. 384/45
[58] Field of Search .................................. 384/43–45, 384/49

[56] References Cited

U.S. PATENT DOCUMENTS

| | | | |
|---|---|---|---|
| 1,923,853 | 8/1933 | Van Duyn | 384/49 |
| 4,433,876 | 2/1984 | Mottate | 384/45 |
| 4,441,765 | 4/1984 | Kasai et al. | 384/45 |
| 4,797,012 | 1/1989 | Tanaka | 384/45 |
| 4,854,741 | 8/1989 | Mottate et al. | 384/45 |
| 4,898,478 | 2/1990 | Osawa | 384/45 |
| 4,974,971 | 12/1990 | Tanaka | 384/45 |

FOREIGN PATENT DOCUMENTS

| | | |
|---|---|---|
| 3410588 | 10/1984 | Fed. Rep. of Germany ........ 384/45 |
| 55-72912 | 2/1980 | Japan . |
| 63-24258 | 4/1988 | Japan . |
| 2247722 | 3/1992 | United Kingdom . |

Primary Examiner—Thomas R. Hannon
Attorney, Agent, or Firm—Armstrong, Westerman, Hattori, McLeland & Naughton

[57] ABSTRACT

A four-directional load bearing guide having an improved rigidity against a vertical, horizontal or momental load, and thereby maintaining an improved accuracy in position of a bearing body relative to a track during a reciprocating motion. Each of ball rolling surfaces on at least one of the track and the bearing body is defined by a groove having the shape of a Gothic arch in cross section, and consists of two curved surfaces joined together, and so positioned that a vertical or horizontal load bearing upon the guide may act upon one or the other of the curved surfaces substantially in the direction in which the load bears upon the guide.

8 Claims, 7 Drawing Sheets

GUIDE FOR THE UNIFORM BEARING OF A LOAD IN FOUR DIRECTIONS AND A RECIPROCATING TABLE INCLUDING THE SAME

FIELD OF THE INVENTION AND RELATED ART STATEMENT

This invention relates to a guide for the uniform bearing of a load in four directions which is used, for example, on the sliding surface of a table saddle, or machining center in a machine tool, or on that part of a conveying apparatus which supports a heavy object and reciprocates, and to a reciprocating table including such a guide.

A known guide for the uniform bearing of a load in four directions is disclosed in Japanese Patent Publication No. 38812/1982. It is generally shown at 40 in FIG. 11 of the accompanying drawings, and comprises a track 42 having two ball rolling surfaces 44 formed in each of a pair of opposite sides thereof, a bearing body 46 having a concavity 50 for fitting the track 42, and formed on its inner surface with a total of four ball rolling surfaces 48 each facing one of the ball rolling surfaces 44 of the track 42, and a multiplicity of balls 52 held between the ball rolling surfaces 44 of the track 42 and the corresponding ball rolling surfaces 48 of the bearing body 46.

Each of the ball rolling surfaces 44 and 48 is defined by a groove having the shape of a single arc in cross section and has a radius of curvature which is substantially equal to the radius of the balls 52. The balls 52 and the ball rolling surfaces 44 and 48 form load acting lines L each having an angle of 45° to the horizontal.

FIG. 12 shows another known guide for the uniform bearing of a load in four directions that is disclosed in Japanese Utility Model Publication No. 24258/1988. The guide comprises a track 62 having ball rolling surfaces 64, a bearing body 66 having ball rolling surfaces 68, and balls 72 held therebetween. Each ball rolling surface 64 of the track 62 is defined by a groove having the shape of a Gothic arch in cross section and consists of two curved surfaces 64a and 64b joined together. Likewise, each ball rolling surface 68 of the bearing body 66 is defined by a groove having the shape of a Gothic arch in cross section and consists of two curved surfaces 68a and 68b joined together. The balls 72 and the ball rolling surfaces 64 and 68 form load acting lines each having an angle of 45° to the horizontal, as in the device shown in FIG. 11.

As the load acting lines lie at the angle of 45° to the horizontal, however, the guide shown in FIG. 11 is too low in rigidity against a momental load to be suitable for uniaxial use, though it may be able to bear uniformly any load acting upon it vertically or horizontally. Moreover, it is likely that a load acting vertically or horizontally upon the guide may cause a change in the points of contact between the balls and the ball rolling surfaces, and thereby the displacement of the bearing body in the direction of the load and away from its accurate position relative to the track.

The guide shown in FIG. 12 has likewise the drawback which is due to the load acting lines lying at the angle of 45° to the horizontal. A load acting upon it vertically or horizontally is likely to cause the displacement of the bearing body away from its accurate position relative to the track.

When a guide of the type under consideration is used, its track is fixed to a bed, and its bearing body to a table, and the guide is used to guide the reciprocating motion of the table in a straight line along the bed. No accurate reciprocating motion of the table has, however, been realized by any known guide, since the load acting upon it causes the displacement of the bearing body, as hereinabove stated. Therefore, a machine tool in which such a table is employed has been likely to make a significant dimensional error in machining a workpiece.

OBJECTS AND SUMMARY OF THE INVENTION

Under these circumstances, it is a first object of this invention to provide a four-directional uniform load guide which has a sufficiently improved rigidity against any momental load to be suitable for uniaxial use, and a drastically improved accuracy in the relative positions of a bearing body and a track in the direction of any load.

It is a second object of this invention to provide a reciprocating table which can perform an accurate reciprocating motion.

The first object of this invention is attained by a four-directional uniform load guide which comprises a track having a plurality of ball rolling surfaces formed on its outer surface, a bearing body having a concavity for fitting the track, and formed on its inner surface with a plurality of ball rolling surfaces each facing one of the ball rolling surfaces on the track, and a multiplicity of balls held between the ball rolling surfaces on the track and the corresponding ball rolling surfaces on the bearing body, each of the ball rolling surfaces on at least one of the track and the bearing body being defined by a groove having the shape of a Gothic arch in cross section, and consisting of two curved surfaces joined together, those curved surfaces being so positioned that a vertical and a horizontal load bearing on the guide may act upon the curved surfaces, respectively, along lines extending in those directions which are substantially equal to the directions of the loads bearing on the guide, respectively.

The second object of this invention is attained by a reciprocating table comprising a bed, a plurality of substantially parallel linear guides provided on the bed, and a table adapted to be guided by the linear guides for performing a reciprocating motion in a straight line along the bed, each of the linear guides comprising a track secured to the bed and having a plurality of ball rolling surfaces formed on its outer surface, a bearing body secured to the table, having a concavity for fitting the track, and formed on its inner surface with a plurality of ball rolling surfaces each facing one of the ball rolling surfaces on the track, and a multiplicity of balls held between the ball rolling surfaces on the track and the corresponding ball rolling surfaces on the bearing body, one of the linear guides being a four-directional load guide as hereinabove defined, and the rest thereof being a radial load guide for bearing only a vertical load.

It is essential that each of the ball rolling surfaces on at least one of the track and the bearing body in the four-directional load guide of this invention be defined by a groove having the shape of a Gothic arch in cross section. The ball rolling surfaces on the track may be defined by grooves having the shape of a Gothic arch in cross section, while the ball rolling surfaces on the bearing body are defined by grooves having the shape of a single arc in cross section, or vice versa. Alternatively, all of the ball rolling surfaces on the track and the bearing body may be defined by grooves having the shape of a Gothic arch in cross section (hereinafter referred to simply as "Gothic arch grooves").

Each ball rolling surface defined by a Gothic arch groove consists of two curved surfaces joined together, and so arranged that a load may act substantially vertically or horizontally upon either of the curved surfaces. This arrangement enables each curved surface to bear a large vertical or horizontal load, since the directions of lines along which the vertical and horizontal loads bearing upon the guide act upon the curved surfaces are substantially equal to the directions of the loads bearing upon the guide. Thus, the guide of this invention can bear a large momental load, and is sufficiently rigid against any momental load to be suitable for uniaxial use.

The arrangement of the curved surfaces as hereinabove described also makes it possible to prevent, or control to a minimum, any change in position that a load bearing upon the guide might otherwise cause to the points of contact between the balls and the curved surfaces, since the tangential lines passing through the points of their contact are substantially perpendicular to the direction of the load. This enables a drastically improved accuracy in the vertical or horizontal position of the bearing body relative to the track.

The reciprocating table of this invention includes a four-directional load guide of this invention as one of the linear guides which guide the motion of the table in a straight line. Therefore, it is possible to prevent, or control to a minimum, any displacement of the table in the direction of a vertical or horizontal load bearing upon it, and thereby improve drastically the working accuracy of, for example, a machine tool in which the table is employed.

The rest of the linear guides is a radial load guide, or guides. The radial load guide is a linear guide which bears only a vertical load, and hardly bears any horizontal load. Each of the ball rolling surfaces on its bearing body and track may be defined by a groove having the shape of a single arc in cross section (hereinafter referred to simply as "single arc groove"), and consist of a single curved surface, if the direction of a line along which a load acts upon the curved surface is equal to the direction of a vertical load bearing upon the guide.

It is for the reason which will hereunder be set forth, that only one of the linear guides is a four-directional load guide, while the rest thereof is a radial load guide, or guides.

If in a system including a plurality of parallel linear guides for guiding the reciprocating motion of a table relative to a bed, the guides are out of parallel, or if there is any difference in thermal expansibility between the table and the bed, it is likely that the horizontal displacement of bearing bodies relative to tracks may bring about a sharp increase in the rolling resistance of balls. If all of the linear guides are four-directional load guides of this invention, no smooth reciprocating motion can be expected from the table, since the guides of this invention are high in rigidity against any vertical or horizontal load.

According to this invention, therefore, only the linear guide serving as a base for the position of the table is a four-directional load guide to ensure the accurate positioning of the table, and the remaining linear guide (or guides) is a radial load guide which can absorb any horizontal displacement of its bearing body relative to its track. The reciprocating table of this invention can, therefore, perform an accurate and smooth reciprocating motion.

DETAILED DESCRIPTION OF THE PREFERRED EMBODIMENTS

Description will now be made in detail of the four-directional uniform load guide and reciprocating table of this invention with reference to the accompanying drawings.

Figure 1:
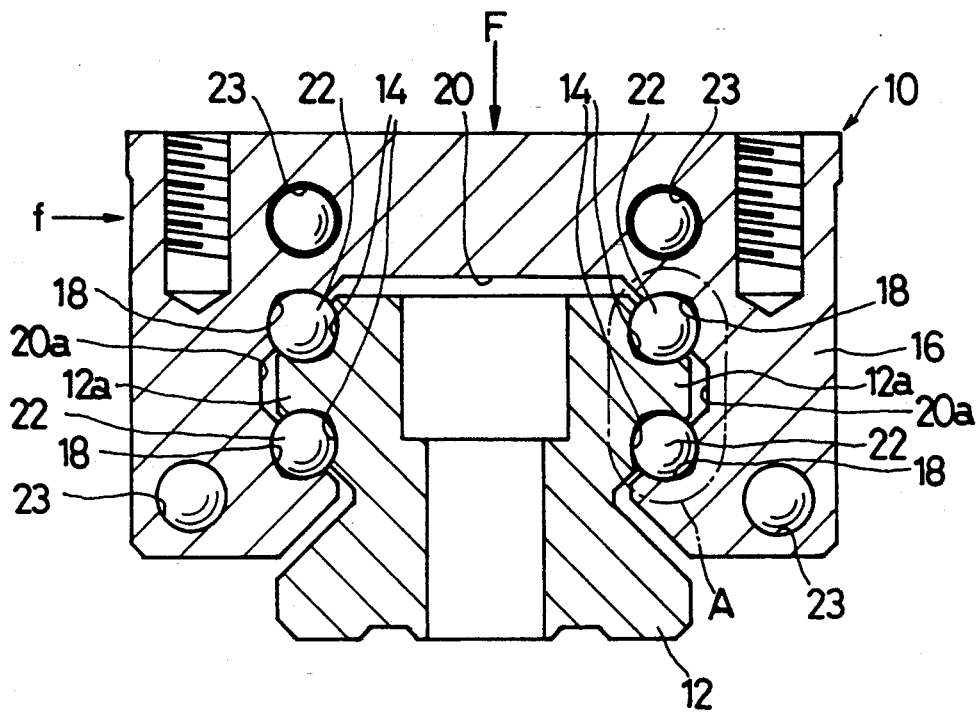
FIG. 1 is a cross sectional view of a four-directional uniform load guide embodying this invention.

Reference is first made to FIG. 1 showing one form of four-directional uniform load guide embodying this invention. The guide 10 is essentially of the same construction with the known guide disclosed in Japanese Patent Publication No. 38812/1982 as hereinbefore described. Accordingly, it comprises a track 12, a bearing body 16, and a multiplicity of balls 22 which enable the bearing body 16 to perform a smooth reciprocating motion along the track 12.

Figure 2:
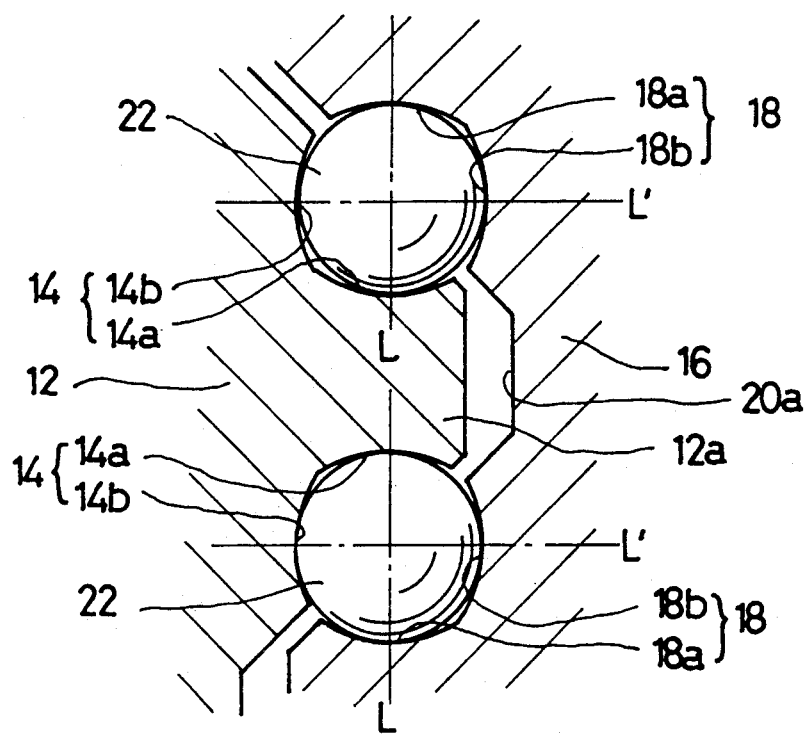
FIG. 2 is an enlarged view of part A of FIG. 1.

The track 12 has two ball rolling surfaces 14 formed on each of a pair of opposite sides thereof. Each ball rolling surface 14 is defined by a Gothic arch groove, and consists of two curved surfaces 14a and 14b joined together, as shown in FIG. 2. Each of the curved surfaces 14a and 14b is arcuate in cross section, and has a radius of curvature which is slightly larger than the radius of the balls 22.

The bearing body 16 has a concavity 20 which is open at its bottom, and which is generally complementary to the cross-sectional configuration of the track 12. The bearing body 16 has an inner surface defined by its concavity 20, and formed with a total of four ball rolling surfaces 18 each facing one of the ball rolling surfaces 14 on the track 12. The ball rolling surfaces 18 are of the same shape with the ball rolling surfaces 14. In other words, each ball rolling surface 18 is defined by a Gothic arch groove, and consists of two curved surfaces 18a and 18b joined together, as shown in FIG. 2. The bearing body 16 also has ball passages 23 each allowing for the circulation of the balls 22 under no load from one end of one of the ball rolling surfaces 18 to the other end thereof.

The track 12 has on each side thereof a projection 12a on which two of the ball rolling surfaces 14 are formed. On the other hand, the bearing body 16 has on each of two opposite sides of its concavity 20 a recess 20a in which two of the ball rolling surfaces 18 are formed, and in which the projection 12a on one side of the track 12 is fitted.

Figure 3:
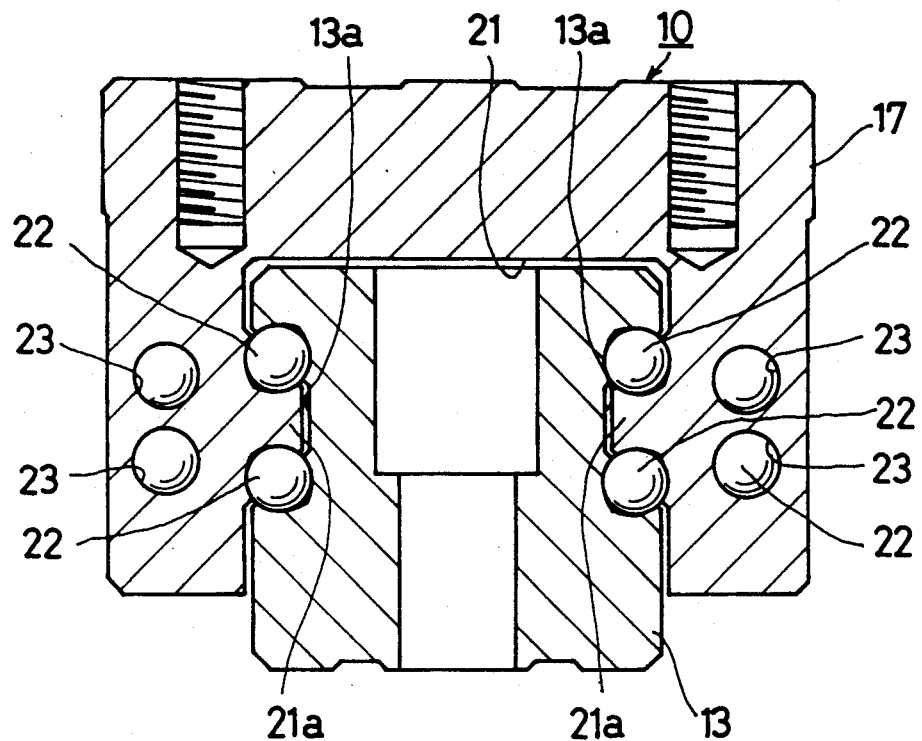
FIG. 3 is a cross sectional view of a modified form of the guide shown in FIG. 1.

A modified form of the guide shown in FIG. 1 is shown in FIG. 3. It is obtained by reversing the arrangement of the projections and recesses shown in FIG. 1. A track 13 has a pair of recesses 13a formed on its opposite sides, respectively, and a bearing body 17 has a pair of projections 21a formed on the opposite sides, respectively, of its concavity 21, and each fitted in one of the recesses 13a of the track 13.

Referring to FIG. 2 again, the curved surface 14a forming one half of each ball rolling surface 14 and the curved surface 18a forming one half of the corresponding ball rolling surface 18 face each other vertically of the guide 10, while the curved surface 14b forming the other half of the ball rolling surface 14 and the curved surface 18b forming the other half of the ball rolling surface 18 face each other horizontally of the guide 10. Accordingly, the balls are held between the curved surfaces 14a and 18a vertically of the guide 10, and between the curved surfaces 14b and 18b horizontally thereof.

It, therefore, follows that, when a vertical load has been applied to the guide 10, the direction of a load acting line L passing through the curved surfaces 14a and 18a is equal to the direction of the load bearing upon the guide 10. Likewise, the direction of a load acting line L' which passes through the curved surfaces 14b and 18b when a horizontal load has been applied to the guide 10 is substantially equal to the direction of the load. The direction of each load acting line means the direction in which the load acts upon the curved surfaces.

If a downward load F has, for example, been applied to the guide 10 as shown in FIG. 1, the load F is transmitted from the curved surfaces 18a to the balls 22 without producing any component force, since the direction of the load acting line L passing through each curved surface 18a is substantially equal to the direction of the load. The load F is then transmitted from the balls 22 to the curved surfaces 14a without producing any component force. As the directions of all the load acting lines L passing through the curved surfaces 14a and 18a are substantially equal to the direction of the load, the guide 10 can bear a large downward load. Likewise, it can bear a large horizontal load f, since the directions of all the load acting lines L' passing through the curved surfaces 14b and 18b are substantially equal to the direction of the load f.

The load F does not cause any displacement in the points of contact between the balls 22 and the curved surfaces 14a and 18a, since the load acting lines L are substantially equal in direction to the load F, nor does the load f cause any displacement in the points of contact between the balls 22 and the curved surfaces 14b and 18b, since the load acting lines L' are substantially equal in direction to the load f. Therefore, the guide 10 is high in rigidity against any vertical or horizontal load, and is an optimum guide as a base for the positioning of a reciprocating table.

Figure 4:
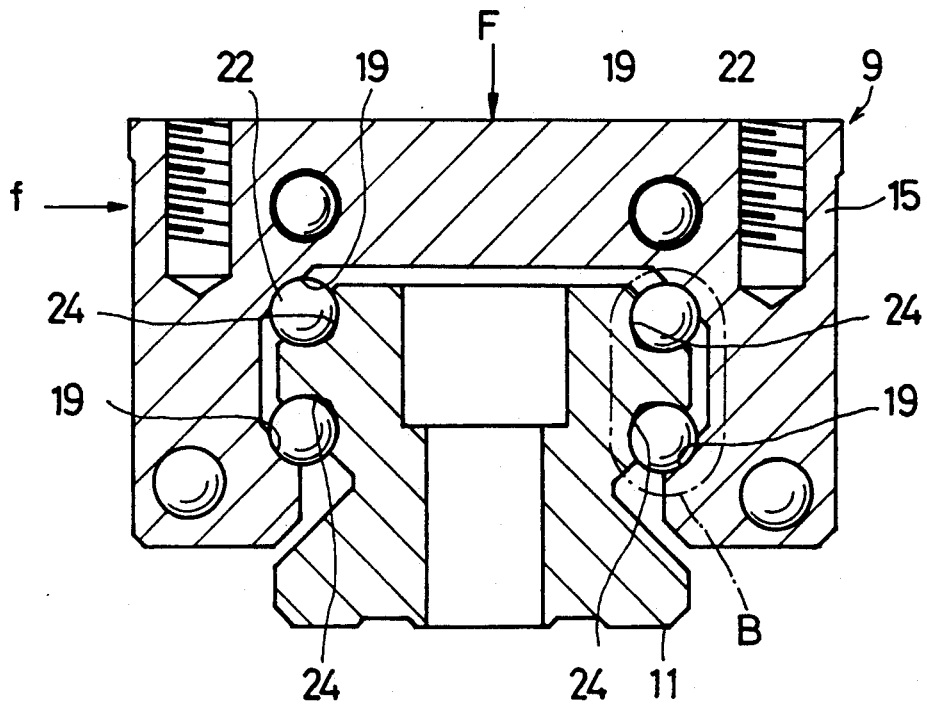
FIG. 4 is a cross sectional view of another four-directional uniform load guide embodying this invention.

Attention is now directed to FIG. 4 showing another four-directional uniform load guide 9 embodying this invention. It includes a track 11 which is identical in construction to the track 12 as hereinabove described with reference to FIG. 1. No further description of the track 11 will, therefore, be made. It also includes a bearing body 15 which is substantially identical to the bearing body 16 shown in FIG. 1. The only difference therebetween is that each ball rolling surface 19 formed on the bearing body 15 is defined by a single arc groove and consists of a single curved surface.

Figure 5:
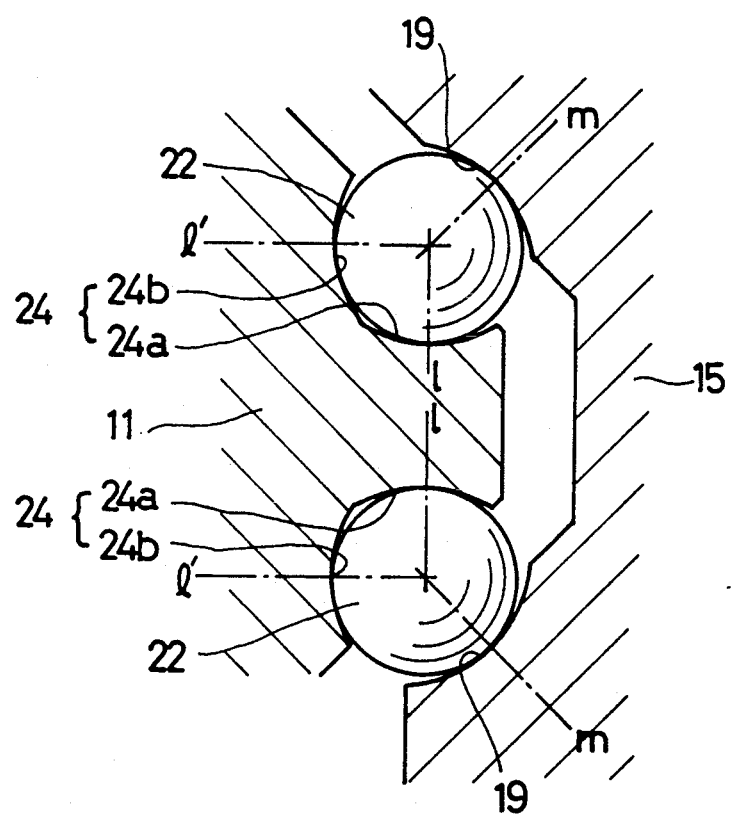
FIG. 5 is an enlarged view of part B of FIG. 4.

Each ball rolling surface 24 formed on the track 11 consists of two curved surfaces 24a and 24b, as shown in FIG. 5. The curved surface 24a faces upward or downward, while the curved surface 24b faces horizontally. Each ball rolling surface 19 on the bearing body 15 is so formed that a load acting line m passing therethrough may have an angle of about 45° to the directions of a vertical and a horizontal load bearing upon the guide 9. The curved surfaces 24a and 24b and the ball rolling surfaces 19 hold balls 22 rollably therebetween.

The load acting lines l along which a downward load F acts upon the curved surfaces 24a are equal in direction to the load F, and likewise, the load acting lines l' along which a horizontal load f acts upon the curved surfaces 24b are substantially equal in direction to the load f. The guide 9 can, therefore, bear both a large vertical and horizontal load.

The vertical or horizontal load bearing upon the guide 9 is transmitted from the bearing body 15 to the balls 22 along the load acting lines m passing through the ball rolling surfaces 19, and thereby presses the balls 22 against the curved surfaces 24a and 24b forming the ball rolling surfaces 24 along the load acting lines l and l'. Therefore, no displacement occurs to the points of contact between the balls 22 and the curved surfaces 24a and 24b, but the guide 9 exhibits high rigidity against both the vertical and horizontal loads.

It is, however, likely that, if the vertical or horizontal load F or f exceeds a certain level, it may cause displacement in the points of contact between the balls 22 and the ball rolling surfaces 19, since the direction of the load acting lines m does not coincide with that of the load. It can, therefore, be said that the guide 9 is lower in rigidity than the guide 10 shown in FIG. 1.

Figure 6:
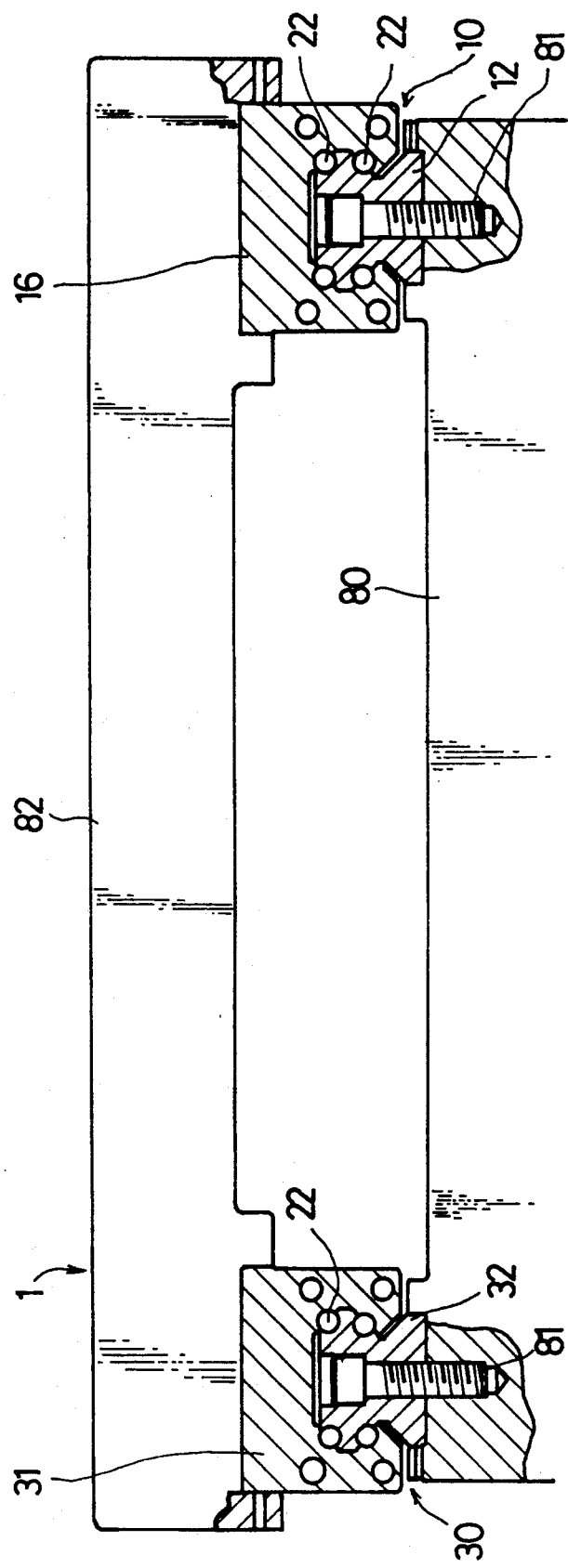
FIG. 6 is a cross sectional view of a reciprocating table embodying this invention.

Reference is now made to FIG. 6 showing a reciprocating table 1 embodying this invention. The table 1 comprises a bed 80, a table 82 and two parallel linear guides secured to the bed 80 by bolts 81 and used for guiding the reciprocating motion of the table 82 in a straight line along the bed 80. One of the linear guides is a four-directional uniform load guide 10 of the construction shown in FIG. 1 which provides a base for the positioning of the table 82, and the other is a radial load guide 30 which bears only a vertical load acting upon the table 82.

The guide 10 has a high rigidity against any vertical or horizontal load and thereby maintains a high accuracy in position, as hereinbefore stated. Therefore, it enables the reciprocating table 1 to support even a large vertical or horizontal load acting upon the table 82 without undergoing any appreciable displacement in the direction of the load.

It is generally true that, if there is any difference in thermal expansibility between a reciprocating table and a stationary bed, or if two linear guides for guiding the table are not satisfactorily parallel to each other, the bearing bodies in the linear guides which are fixed to the table are horizontally displaced from the tracks fixed to the bed, resulting in a sharp increase of resistance to the motion of the table by the guides. No smooth reciprocating motion can, therefore, be expected from the table.

The radial load guide 30, however, hardly bears any horizontal load, but absorbs any horizontal displacement of the bearing body 31 from the track 32. The combination of the radial load guide 30 with the four-directional load guide 10 enables the reciprocating table 1 to perform a smooth reciprocating motion without having any substantial resistance to its motion. The positional accuracy of the table 82 is maintained by the guide 10.

Figure 7:
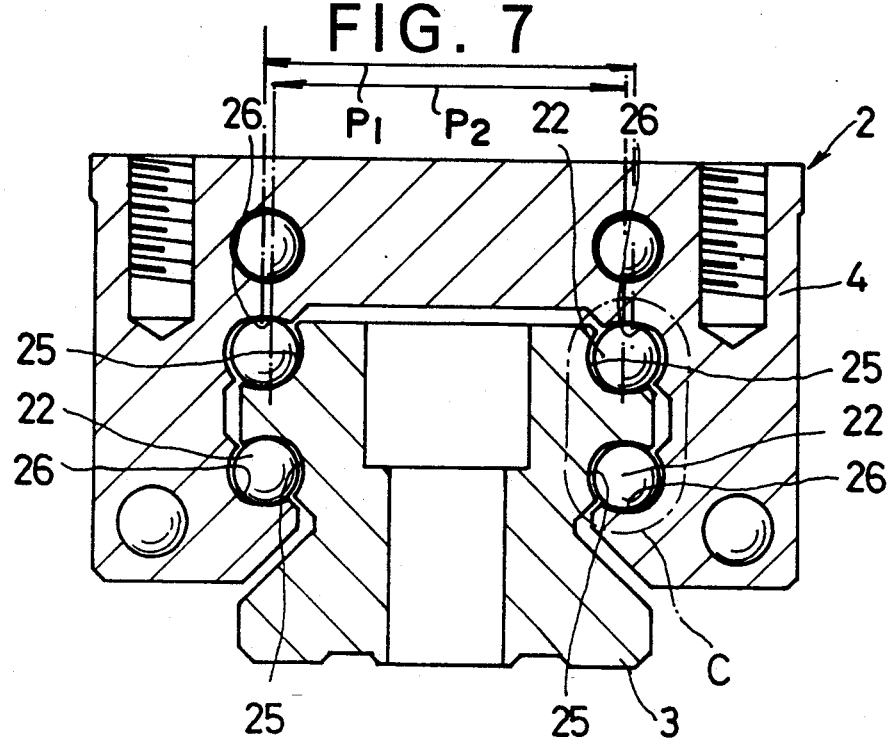
FIG. 7 is a cross sectional view of one form of radial load guide employed in the reciprocating table of this invention.
Figure 8:
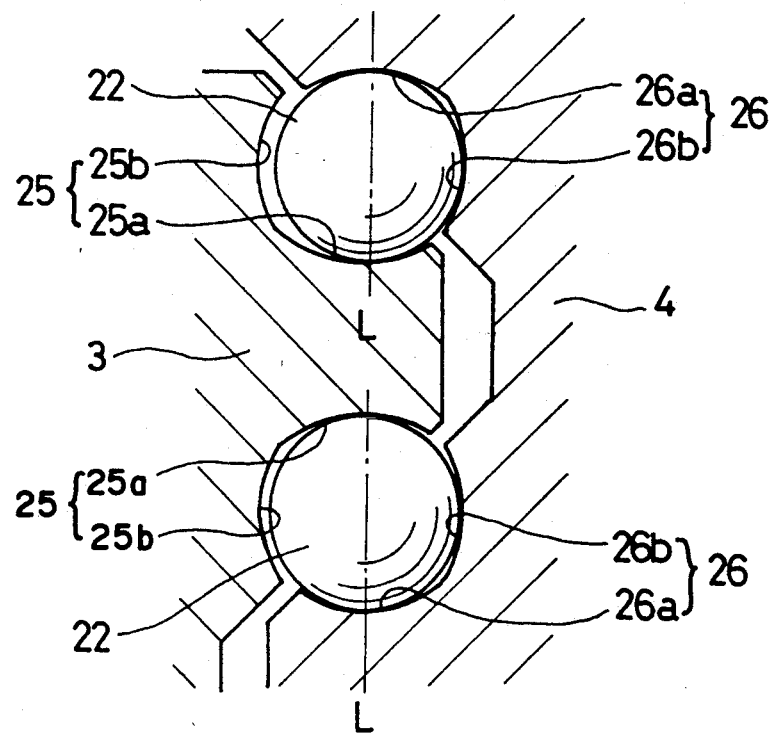
FIG. 8 is an enlarged view of part C of FIG. 7.

Attention is now drawn to FIG. 7 showing in detail one form of radial load guide. The radial load guide 2 is substantially identical in construction to the four-directional load guide 10 shown in FIG. 1. Each ball rolling surface 25 on a track 3 is defined by a Gothic arch groove and consists of two curved surfaces 25a and 25b joined together, and each ball rolling surface 26 on a bearing body 4 is also defined by a Gothic arch groove and consists of two curved surfaces 26a and 26b, as shown in FIG. 8. The arrangement of the curved surfaces 25a, 25b, 26a and 26b is identical to that of the curved surfaces 14a, 14b, 18a and 18b on the guide 10 which is shown in FIG. 2.

The radial load guide 2 differs from the guide 10 in that the curved surfaces 25b and 26b facing each other have therebetween a distance which is greater than that between the other curved surfaces 25a and 26a facing each other. Therefore, the balls 22 which are held between the ball rolling surfaces 25 on the track 3 and the ball rolling surfaces 26 on the bearing body 4 contact the curved surfaces 25a and 26a, but do not contact the curved surfaces 25b and 26b. This relationship is achieved, as the horizontally spaced apart curved surfaces 26a on the bearing body 4 have therebetween a distance $P_1$ which is greater than the distance $P_2$ between the horizontally spaced apart curved surfaces 25a on the track 3. If the distance $P_1$ were equal to $P_2$, the balls 22 would contact all of the curved surfaces 25a, 25b, 26a and 26b, and the guide 2 would be identical to the guide 10 shown in FIG. 1.

The direction of the load acting line L passing through each pair of curved surfaces 25a and 26a contacting the balls 22 is equal to the direction in which a vertical load acts upon the guide 2. The guide 2 can, therefore, bear a large vertical load without having any appreciable change in height, since no displacement occurs to the points of contact between the balls 22 and the curved surfaces 25a and 26a.

When a horizontal load has been applied to the guide 2, the clearances between the balls 22 and the curved surfaces 25b and 26b permit some horizontal displacement of the bearing body 4 from the track 3. This displacement does not impede the smooth action of the guide 2.

Figure 9:
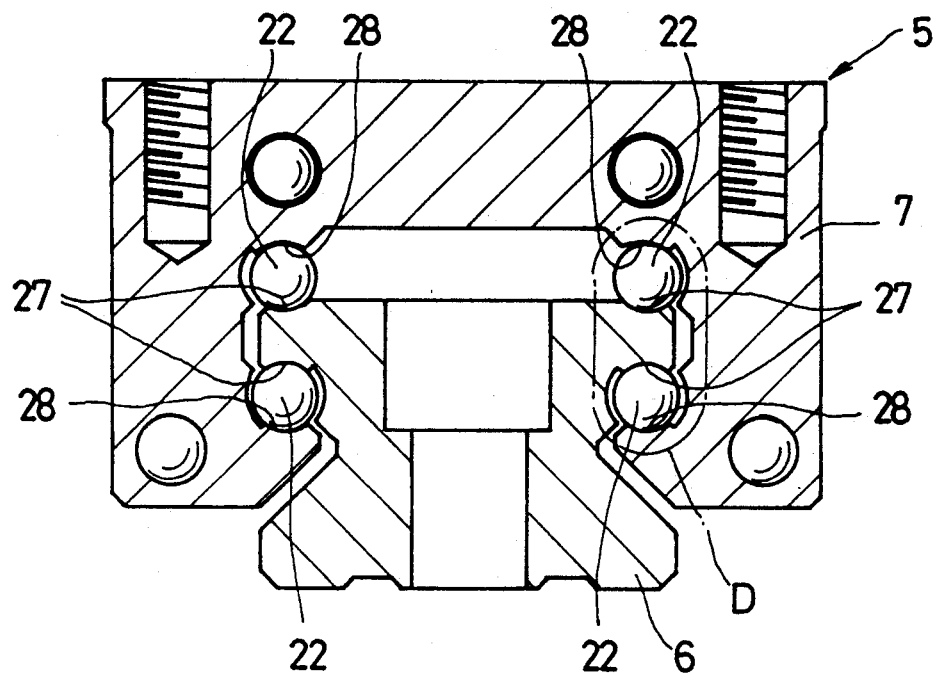
FIG. 9 is a cross sectional view of another form of radial load guide employed in the reciprocating table of this invention.

FIG. 9 shows another form of radial load guide. The radial load guide 5 comprises a track 6 having a total of four ball rolling surfaces 27, a bearing body 7 having a total of four ball rolling surfaces 28 each facing one of the ball rolling surfaces 27 on the track 6, and a plurality of balls 22 held rollably between the ball rolling surfaces 27 and 28, as the guide 2 shown in FIG. 7 does.

Figure 10:
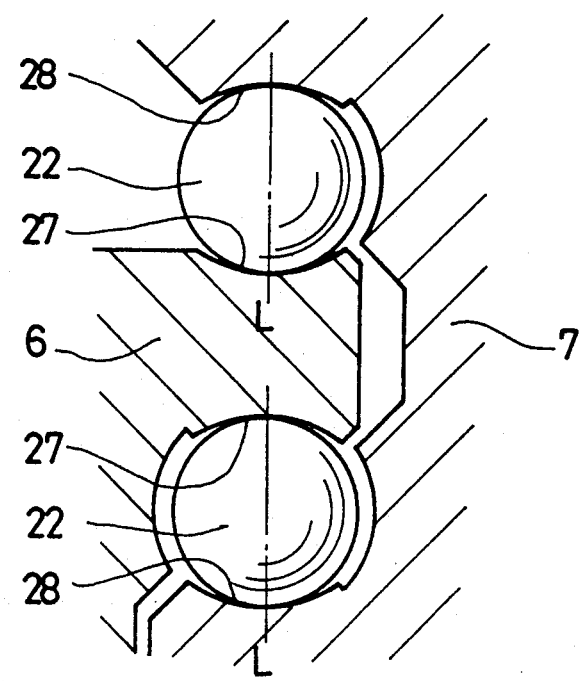
FIG. 10 is an enlarged view of part D of FIG. 9.
Figure 11:
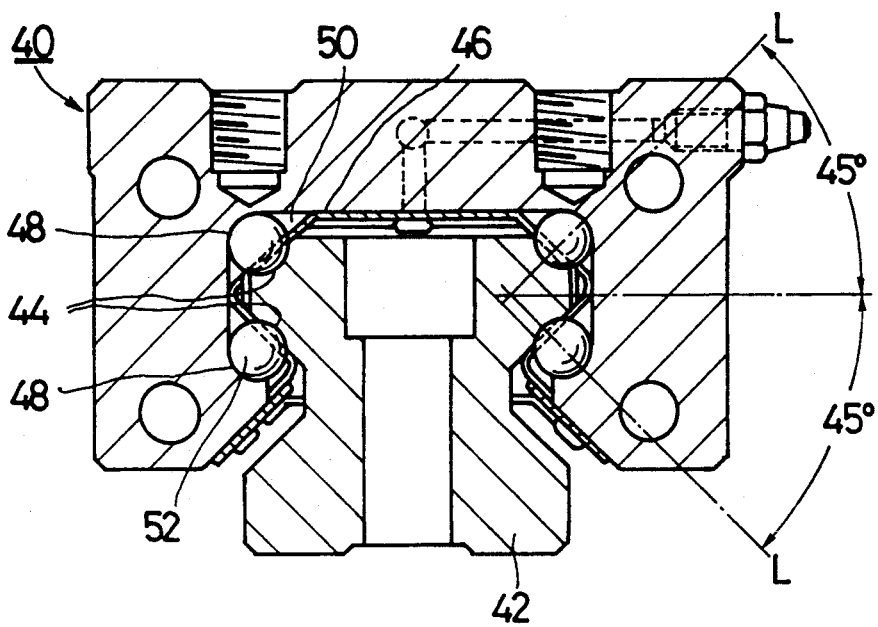
FIG. 11 is a cross sectional view of a known four-directional uniform load guide.
Figure 12:
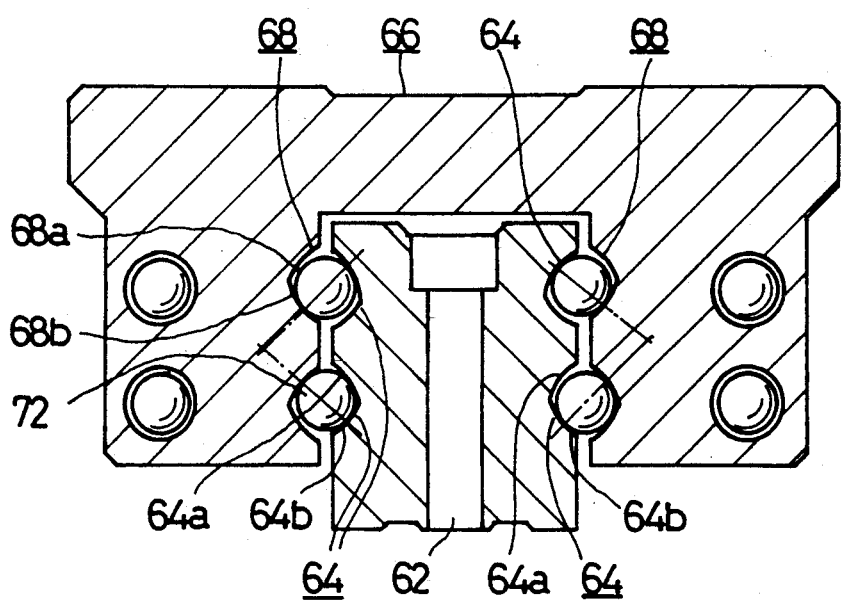
FIG. 12 is a cross sectional view of another known four-directional uniform load guide.

Each of the ball rolling surfaces 27 and 28 is, however, defined by a single arc groove and consists of a single curved surface, as shown in FIG. 10. The direction of the load acting line L passing through each pair of ball rolling surfaces 27 and 28 is equal to the direction in which a vertical load acts upon the guide 5. The guide 5 can, therefore, bear a large vertical load without having any appreciable change in height.

The guide 5 does not have any ball rolling surface that restricts the horizontal movement of the balls 22. A horizontal load acting upon the guide 5, therefore, causes a shift in the points of contact between the balls 22 and the ball rolling surfaces 27 and 28, and thereby the horizontal displacement of the bearing body 7 from the track 6. This displacement does not impede the smooth motion of the guide 5.

What is claimed is:

1. A four-directional load bearing guide comprising:
   a track having a plurality of ball rolling surfaces formed on its outer surface;
   a bearing body having a concavity in which said track is fitted, said bearing body having a plurality of ball rolling surfaces formed on its inner surface, and each facing one of said ball rolling surfaces on said track; and
   a multiplicity of balls held between said ball rolling surfaces on said track and said ball rolling surfaces on said bearing body which face said ball rolling surfaces on said track;
   wherein each of said ball rolling surfaces on at least one of said track and said bearing body is defined by a groove having the shape of a Gothic arch in cross section, and consists of a first curved surface and a second curved surface joined together, and said first and second curved surfaces are so arranged that a vertical load bearing upon said guide acts upon only said first curved surface and a horizontal load bearing upon said guide acts upon only said second curved surface.

2. A guide as set forth in claim 1, wherein each of said ball rolling surfaces on both of said track and said bearing body is defined by a groove which is identical to said groove having the shape of a Gothic arch in cross section.

3. In a four-directional load bearing guide comprising:
   a track having a plurality of ball rolling surfaces formed on its outer surface,
   a bearing body having a concavity in which said track is fitted, said bearing body having a plurality of ball rolling surfaces formed on its inner surface, and each facing one of said ball rolling surfaces on said track, and
   a multiplicity of balls held between said ball rolling surfaces on said track and said ball rolling surfaces on said bearing body which face said ball rolling surfaces on said track,
   the improvement wherein each of said ball rolling surfaces on at least one of said track and said bearing body is defined by a groove having the shape of a Gothic arch in cross section, and consists of two curved surfaces joined together, and said curved surfaces are so arranged that a vertical or horizontal load bearing upon said guide may act upon one or the other of said curved surfaces substantially in the direction in which said load bears upon said guide;
   wherein each of said ball rolling surfaces on said track is defined by said groove, while each of said ball rolling surfaces on said bearing body is defined by a groove having the shape of a single arc in cross section, and consists of a single curved surface which is so positioned that said vertical or horizontal load bearing upon said guide may act upon said single curved surface at an angle of about 45° to the direction in which said load bears upon said guide.

4. In a reciprocating table apparatus comprising a stationary bed, a plurality of substantially parallel linear guides attached to said bed, and a reciprocating table which can be reciprocated in a straight line along said bed by said linear guides, each of said guides comprising a track secured to said bed and having a plurality of ball rolling surfaces formed on its outer surface, a bearing body secured to said table, and having a concavity in which said track is fitted, said bearing body having a plurality of ball rolling surfaces formed on its inner surface, and each facing one of said ball rolling surfaces on said track, and a multiplicity of balls held between said ball rolling surfaces on said track and said ball rolling surfaces on said bearing body which face said ball rolling surfaces on said track, the improvement wherein one of said linear guides is a four-directional load bearing guide in which each of said ball rolling surfaces on at least one of said track and said bearing body is defined by a groove having the shape of a Gothic arch in cross section, and consists of two curved surfaces joined together, said curved surfaces being so arranged that a vertical or horizontal load bearing upon said one linear guide may act upon one or the other of said curved surfaces substantially in the direction in which said load bears upon said one linear guide, while the rest of said linear guides is a radial load bearing guide which bears only a vertical load.

5. An apparatus as set forth in claim 4, wherein each of said ball rolling surfaces on both of said track and said bearing body in said one linear guide is defined by said groove.

6. An apparatus as set forth in claim 4, wherein each of said ball rolling surfaces on said track in said one linear guide is defined by said groove, while each of said ball rolling surfaces on said bearing body in said one linear guide is defined by a groove having the shape of a single arc in cross section, and consists of a single curved surface which is so positioned that said vertical or horizontal load may act upon said single curved surface at an angle of about 45° to the direction in which said load bears upon said one linear guide.

7. An apparatus as set forth in claim 5 or 6, wherein each of said ball rolling surfaces on both of said track and said bearing body in said radial load bearing guide is defined by a groove having the shape of a Gothic arch in cross section, and consists of two curved surfaces joined together which are so arranged that a vertical or horizontal load bearing upon said radial load bearing guide may act upon one or the other of said last-mentioned curved surfaces substantially in the direction in which said load bears upon said radial load bearing guide, one of said curved surfaces on said track and one of said curved surfaces on said bearing body facing each other and being vertically spaced apart from each other, while the other of said curved surfaces on said track and the other of said curved surfaces on said bearing body face each other and are horizontally spaced apart from each other by a distance which is slightly greater than the distance by which said vertically spaced apart curved surfaces are spaced apart from each other, so that said balls are in contact only with said two curved surfaces.

8. An apparatus as set forth in claim 5 or 6, wherein each of said ball rolling surfaces on both of said track and said bearing body in said radial load bearing guide is defined by a groove having the shape of a single arc in cross section, and consists of a single curved surface which is so positioned that a vertical load bearing upon said radial load bearing guide may act upon said single curved surface substantially in the direction in which said load bears upon said radial load bearing guide.

* * * * *